United States Patent Office 3,010,014
Patented Nov. 21, 1961

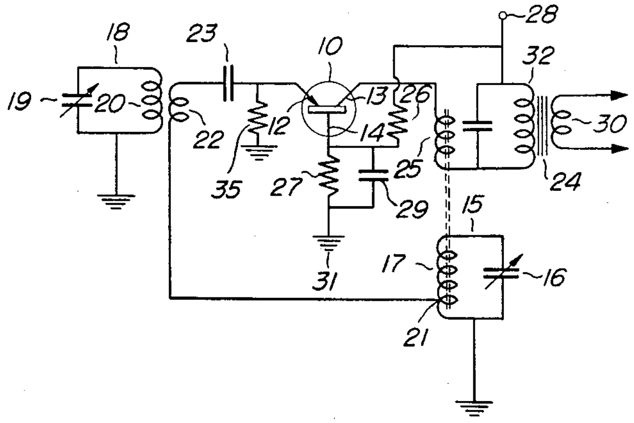
18
23
10
28
32
19
20
12
13
26
30
22
14
35
27
25
29
24
15
17
16
31
21

3,010,014
FREQUENCY CONVERTER CIRCUITS

Hiroshi Tanimura, Osaka, and Hiroshige Ishii, Hiraoka-shi, Japan, assignors to Sanyo Electric Co., Ltd., Mariguchi-shi, Japan, a corporation of Japan
Filed Feb. 5, 1960, Ser. No. 6,941
Claims priority, application Japan Sept. 7, 1959
1 Claim. (Cl. 250—20)

The present invention relates to improvements in frequency converter circuits or oscillator-mixer circuits utilizing a single transistor, and particularly to improvements in converter circuits of short-wave super heterodyne receivers.

In the prior arts, as is known as frequency converters for radio broadcast receivers, the oscillator voltage and the mixer voltage are both applied to the base electrode of the single transistor. It has been found, however, that such a circuit cannot be utilized satisfactorily for receiving short-wave broadcast with mere changes in circuit constants, because such a circuit is apt to produce abnormal oscillations due to much feed-back occurring in the short wave range, and also has a large interlocking effect.

An object of the present invention is to provide a frequency converter circuit for use in short wave radio receiver, in which the oscillator voltage and the mixer voltage are both applied to the emitter electrode of a base-grounded transistor, whereby abnormal oscillation is prevented and stable oscillation is sustained.

Other objects and particularities of the present invention will be made obvious from the following description with reference to the accompanying drawings, in which the single figure is a circuit diagram showing a frequency converter circuit embodying the present invention for short wave radio receiver.

Referring to the drawings, a transistor 10 has an emitter electrode 12, a collector electrode 13 and a base electrode 14. A local oscillator circuit 15 comprises a variable condenser 16 and an inductance 17 forming a grounded parallel resonance circuit. An antenna circuit 18 comprises a parallel resonance circuit consisting of a variable condenser 19 and an inductance 20. The two condensers 16 and 19 are connected together for gang tuning. The inductance 17 of oscillator circuit 15 is provided with a tap 21, while the inductance 20 of antenna circuit 18 is inductively coupled with a secondary inductance 22.

According to the present invention, the oscillator voltage and the mixer voltage are both applied to the emitter 12 of transistor 10. For this purpose, the tap 21 is connected to one end of secondary inductance 22, and the other end of inductance 22 is connected to the emitter 12 through a capacitor 23. The collector circuit of transistor 10 includes a regenerative feed-back inductance 25 which is electro-magnetically coupled with the inductance 17 of oscillator circuit 15, and an intermediate frequency transformer 24 has its primary coil 32 connected in series with the inductance 25. An intermediate frequency signal is derived from a secondary coil 30 of transformer 24, in the well-known manner. One end of the primary coil 32 of transformer 24 is connected to a terminal 28 of a suitable voltage source, not shown, and the base electrode 14 of transistor 10 is connected to the joint point of two resistors 26 and 27 which are connected in series between the terminal 28 and the earth 31, so that the base 14 of transistor 10 may suitably be biased. The bias resistor 27 is bypassed by a capacitor 29 and the base electrode grounded through said capacitor 29 as mentioned above.

In case the converter circuit of the present invention is considered separately as an oscillator or a mixer, in either case the input circuit is formed by the RF circuit, the local oscillator circuit, the emitter and the base, and the output circuit is formed by the feed-back coil (the tickler coil), the intermediate frequency transformer, the base and the collector. In both cases where the converter circuit is operating as oscillator and mixer, respectively, the base of the transistor is common, that is to say, the transistor operates in both of the oscillator and the mixer under common-base condition. Particularly, the fact that the mixing circuit is a common-base type presents large advantages in which signals, on the collector, having frequencies according to the input signals fed-back by the capacitance $C_c$ between the collector and the base come only into the base circuit grounded through the condenser, so that the mixer circuit does not operate as an oscillator and generates on any abnormal oscillation. These are important features in this invention.

Numerical values of various elements in a practical apparatus embodying the invention, in which the transistor is of PNP type, are given below as an example:

| | |
|---|---|
| Capacitor 23 | 0.002μF. |
| Resistor 26 | 20KΩ. |
| Resistor 27 | 4.5KΩ. |
| Capacitor 29 | 0.05μF. |
| Local oscillator frequency | 4.355MC–12.455MC. |
| Receiving frequency | 3.9–12MC. |
| Intermediate frequency | 0.455MC. |
| Bias resistor 35 | 1.5KΩ. |

According to the invention, the oscillator voltage and the mixer voltage are both applied to the emitter of a single transistor of which the base is grounded, and we have found that the converter operation is quite stable.

We claim:

A converter circuit for short wave use, comprising a transistor including an emitter, a collector and a base, an antenna circuit comprising a variable condenser, an inductor connected in parallel with said condenser and a secondary inductor inductively coupled with said first mentioned inductor, an oscillator circuit comprising a second variable condenser and an inductor connected in parallel with said second variable condenser and including a tap, a coupling condenser, an intermediate frequency transformer including primary and secondary coils and a regenerative feed-back coil, said tap being connected with one end of said secondary inductor of said antenna circuit, another end of said secondary inductor being connected with said emitter through said coupling condenser, said primary coil being connected with said collector through said feed-back coil, and a further condenser, said base being grounded through said further condenser and exhibiting a low impedance in relation to the high frequency feed-back from the collector to the base by collector capacitance, whereby said transistor operates in common base condition when said converter circuit operates as a mixer.

References Cited in the file of this patent

UNITED STATES PATENTS

| | | |
|---|---|---|
| 2,816,220 | Goodrich | Dec. 10, 1957 |
| 2,878,376 | Stern | Mar. 17, 1959 |
| 2,880,312 | Koch | Mar. 31, 1959 |
| 2,894,126 | Horgan | July 7, 1959 |